(12) United States Patent
Oh et al.

(10) Patent No.: US 10,529,985 B2
(45) Date of Patent: Jan. 7, 2020

(54) CATHODE ACTIVE MATERIAL FOR LITHIUM SECONDARY BATTERY

(71) Applicant: LG Chem, Ltd., Seoul (KR)

(72) Inventors: Hyun Jin Oh, Daejeon (KR); Ho Suk Shin, Daejeon (KR); Jin Hyung Lim, Daejeon (KR); Dong Hun Lee, Daejeon (KR); Joo Hong Jin, Daejeon (KR); Wang Mo Jung, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/058,594

(22) Filed: Aug. 8, 2018

(65) Prior Publication Data

US 2018/0351169 A1     Dec. 6, 2018

Related U.S. Application Data

(62) Division of application No. 14/437,079, filed as application No. PCT/KR2014/010257 on Oct. 29, 2014, now Pat. No. 10,056,605.

(30) Foreign Application Priority Data

Oct. 29, 2013   (KR) .................. 10-2013-0129617

(51) Int. Cl.
    *H01M 4/131*      (2010.01)
    *H01M 4/36*       (2006.01)
    (Continued)

(52) U.S. Cl.
    CPC ......... *H01M 4/366* (2013.01); *H01M 4/0402* (2013.01); *H01M 4/0471* (2013.01);
    (Continued)

(58) Field of Classification Search
    None
    See application file for complete search history.

(56) References Cited

U.S. PATENT DOCUMENTS

2002/0119372 A1   8/2002   Zhang
2002/0119375 A1   8/2002   Zhang
(Continued)

FOREIGN PATENT DOCUMENTS

CN    102723459 A    10/2012
JP    H08138670 A    5/1996
(Continued)

OTHER PUBLICATIONS

International Search Report for Application No. PCT/KR2014/010257 dated Jan. 28, 2015.
(Continued)

*Primary Examiner* — Lucas J. O'Donnell
(74) *Attorney, Agent, or Firm* — Lerner, David, Littenberg, Krumholz & Mentlik, LLP

(57) ABSTRACT

Provided are a method of preparing a cathode active material including coating a surface of a lithium transition metal oxide with a lithium boron oxide by dry mixing the lithium transition metal oxide and a boron-containing compound and performing a heat treatment, and a cathode active material prepared thereby.

A method of preparing a cathode active material according to an embodiment of the present invention may easily transform lithium impurities present in a lithium transition metal oxide into a structurally stable lithium boron oxide by performing a heat treatment near the melting point of a boron-containing compound.

Also, a coating layer may be formed in which the lithium boron oxide is uniformly coated in an amount proportional to the used amount of the boron-containing compound even at a low heat treatment temperature.

7 Claims, 3 Drawing Sheets

(51) Int. Cl.
  *H01M 4/505* (2010.01)
  *H01M 4/525* (2010.01)
  *H01M 4/62* (2006.01)
  *H01M 4/04* (2006.01)
  *H01M 4/1391* (2010.01)
  *H01M 4/485* (2010.01)
  *H01M 10/052* (2010.01)
  *H01M 4/02* (2006.01)

(52) U.S. Cl.
  CPC ......... *H01M 4/131* (2013.01); *H01M 4/1391* (2013.01); *H01M 4/485* (2013.01); *H01M 4/505* (2013.01); *H01M 4/525* (2013.01); *H01M 4/62* (2013.01); *C01P 2006/40* (2013.01); *H01M 10/052* (2013.01); *H01M 2004/028* (2013.01)

(56) References Cited

U.S. PATENT DOCUMENTS

| | | | |
|---|---|---|---|
| 2004/0229124 A1* | 11/2004 | Miyamoto | H01M 10/0525 429/231.1 |
| 2004/0258836 A1 | 12/2004 | Besenhard et al. | |
| 2005/0106463 A1 | 5/2005 | Kikuchi et al. | |
| 2010/0047691 A1* | 2/2010 | Kawakami | H01M 4/366 429/221 |
| 2010/0243952 A1* | 9/2010 | Kumada | C01G 45/1242 252/182.1 |
| 2011/0003200 A1* | 1/2011 | Shizuka | H01M 4/131 429/206 |
| 2011/0200880 A1 | 8/2011 | Yu | |
| 2011/0287321 A1 | 11/2011 | Hiraki et al. | |
| 2012/0107699 A1 | 5/2012 | Yamaki | |
| 2012/0177994 A1* | 7/2012 | Kim | C01G 45/1242 429/224 |
| 2013/0277604 A1 | 10/2013 | Shimokita et al. | |
| 2013/0330615 A1 | 12/2013 | Morita et al. | |
| 2014/0054492 A1 | 2/2014 | Mukai et al. | |
| 2014/0079873 A1 | 3/2014 | Miki et al. | |
| 2014/0087270 A1* | 3/2014 | Yoshida | H01M 4/485 429/304 |
| 2014/0154581 A1* | 6/2014 | Kawasato | C01G 53/50 429/231.95 |

FOREIGN PATENT DOCUMENTS

| | | |
|---|---|---|
| JP | 3195175 B2 | 8/2001 |
| JP | 2002175801 A | 6/2002 |
| JP | 3723444 B2 | 12/2005 |
| JP | 2009152214 A | 7/2009 |
| JP | 2012084547 A | 4/2012 |
| KR | 20050000353 A | 1/2005 |
| KR | 20090013661 A | 2/2009 |
| KR | 20090126962 A | 12/2009 |
| KR | 20100075418 A | 7/2010 |
| KR | 20120046041 A | 5/2012 |
| KR | 20130108717 A | 10/2013 |
| WO | 2012111116 A | 8/2012 |
| WO | 2012117638 A1 | 9/2012 |

OTHER PUBLICATIONS

Search Report from European Application No. 14854871.2, dated Sep. 22, 2016.

\* cited by examiner

CATHODE ACTIVE MATERIAL FOR LITHIUM SECONDARY BATTERY

CROSS-REFERENCE TO RELATED APPLICATION

The present application is a divisional U.S. application Ser. No. 14/437,079, filed Apr. 20, 2015, which is a national phase entry under 35 U.S.C. § 371 of International Application No. PCT/KR2014/010257, filed Oct. 29, 2014, which claims priority to Korean Patent Application No. 10-2013-0129617, filed on Oct. 29, 2013, the disclosures of which are incorporated herein by reference.

TECHNICAL FIELD

The present invention relates to a manufacturing method of a cathode active material, and cathode active material for lithium secondary battery manufactured thereby.

BACKGROUND ART

Lithium secondary batteries have been widely used as power sources of portable devices after they have emerged as small, lightweight, and high-capacity batteries since 1991. Recently, in line with the rapid development of electronics, communications, and computer industries, camcorders, mobile phones, and notebook PCs have appeared and undergone continuous and remarkable development. Accordingly, the demand for lithium secondary batteries as a power source for driving these portable electronic information and communication devices has increased day by day.

Lithium secondary batteries have limitations in that their lifetime rapidly decreases as charge and discharge are repeated. In particular, the above limitations are more severe at high temperature. The reason for this is due to a phenomenon that occurs when an electrolyte is decomposed or an active material is degraded due to moisture in the battery or other effects, and the internal resistance of the battery increases.

In order to address the above limitations, a technique of coating the surface of a cathode active material with an oxide of metal, such as magnesium (Mg), aluminum (Al), cobalt (Co), potassium (K), sodium (Na), and calcium (Ca), by a heat treatment has developed. Also, research to improve energy density and high-rate characteristics by adding $TiO_2$ to a $LiCoO_2$ active material has been conducted.

However, limitations, such as lifetime degradation or gas generation due to the decomposition of the electrolyte during charge and discharge, have not been fully resolved yet.

In the case that impurities are present in the surface of a cathode active material during a process of fabricating an electrode of a lithium secondary battery, the impurities may not only affect aging in a step of preparing an electrode slurry during the process of fabricating an electrode of a lithium secondary battery, but may also cause a swelling phenomenon in the lithium secondary battery by reacting with an electrolyte solution that is injected into the lithium secondary battery.

In order to address the above limitations, a method of coating the surface of a cathode active material with $H_3BO_3$ has been developed.

Examples of the above method may include a method of coating the surface of a cathode active material by mixing the cathode active material with $H_3BO_3$ by shaking several times using a shaker. However, in this case, $H_3BO_3$ particles may agglomerate on the surface of the cathode active material.

As another example, there is a method of coating a cathode active material by mixing the cathode active material and $H_3BO_3$ using mechanical compositing equipment, for example, a Nobilta™ device. In this case, since an amount of a coating layer included in the cathode active material is not increased when $H_3BO_3$ is added in a predetermined amount or more, there may be limitations in the reaction process.

Therefore, there is an urgent need to develop a method of preparing a cathode active material which may improve the performance of a lithium secondary battery while addressing the above limitations.

PRIOR ART DOCUMENTS

Patent Document

Japanese Patent Application Laid-Open Publication No. 2009-152214

DISCLOSURE OF THE INVENTION

Technical Problem

An aspect of the present invention provides a method of preparing a cathode active material which may transform lithium impurities present in a lithium transition metal oxide into a structurally stable lithium boron oxide by performing a heat treatment using a boron-containing compound.

Another aspect of the present invention provides a cathode active material, which includes a coating layer including a lithium boron oxide on the surface of the lithium transition metal oxide, by the method of preparing a cathode active material.

Another aspect of the present invention provides a cathode and a lithium secondary battery including the cathode active material.

Technical Solution

According to an aspect of the present invention, there is provided a method of preparing a cathode active material including coating a surface of a lithium transition metal oxide with a lithium boron oxide by dry mixing the lithium transition metal oxide and a boron-containing compound and performing a heat treatment.

According to another aspect of the present invention, there is provided a cathode active material including: a lithium transition metal oxide; and a coating layer including a lithium boron oxide on a surface of the lithium transition metal oxide.

According to another aspect of the present invention, there is provided a cathode including the cathode active material.

According to another aspect of the present invention, there is provided a lithium secondary battery including the cathode.

Advantageous Effects

A method of preparing a cathode active material according to an embodiment of the present invention may easily transform lithium impurities present in a lithium transition metal oxide into a structurally stable lithium boron oxide by performing a heat treatment near the melting point of a boron-containing compound.

Also, a coating layer may be formed in which the lithium boron oxide is uniformly coated on the surface of the lithium transition metal oxide in an amount proportional to the used amount of the boron-containing compound even at a low heat treatment temperature.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Figure 1:
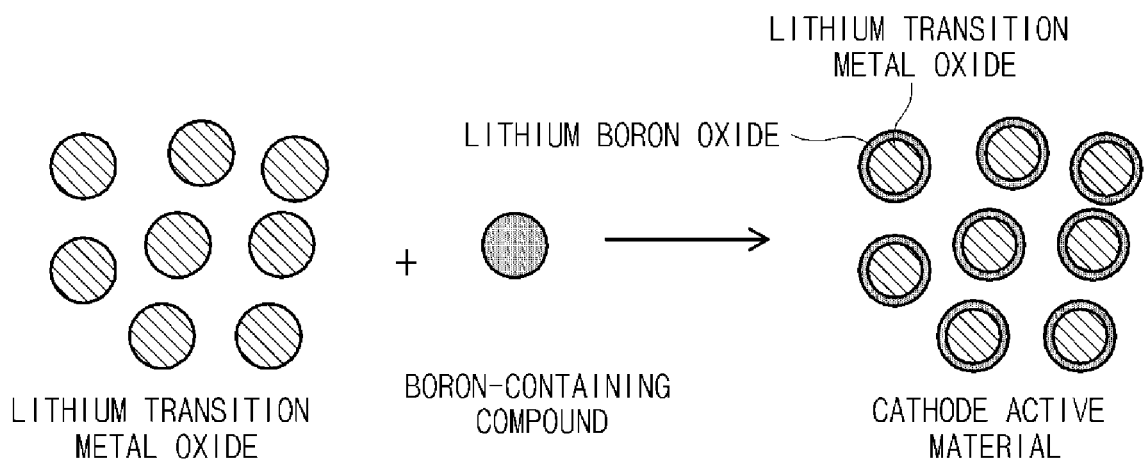
FIG. 1 is a schematic diagram illustrating a method of preparing a cathode active material according to an embodiment of the present invention.

As illustrated in FIG. 1, a method of preparing a cathode active material according to an embodiment of the present invention may include coating a surface of a lithium transition metal oxide with a lithium boron oxide by dry mixing the lithium transition metal oxide and a boron-containing compound and performing a heat treatment.

The method of preparing a cathode active material according to the embodiment of the present invention may easily transform lithium impurities present in a lithium transition metal oxide into a structurally stable lithium boron oxide by dry mixing the lithium transition metal oxide and a boron-containing compound and performing a heat treatment, in particular, near a melting point of the boron-containing compound. Also, a coating layer may be formed in which the lithium boron oxide is uniformly coated on the surface of the lithium transition metal oxide in an amount proportional to the used amount of the boron-containing compound even at a low heat treatment temperature.

In the method of preparing a cathode active material according to the embodiment of the present invention, the boron-containing compound may be any one selected from the group consisting of $H_3BO_3$, $B_2O_3$, $C_6H_5B(OH)_2$, $(C_6H_5O)_3B$, $[CH_3(CH_2)_3O]_3B$, $C_{13}H_{19}BO_3$, $C_3H_9B_3O_6$, and $(C_3H_7O)_3B$, or a mixture of two or more thereof.

In general, a method of forming a coating layer on the surface of the lithium transition metal oxide may include a dry mixing method and a wet mixing method. In the case that the wet mixing method is used, a more uniform coating layer formed on the surface of the lithium transition metal oxide may be obtained. However, with respect to the wet mixing method, the boron-containing compound must be used in a state of an aqueous solution, and in this case, there is a possibility that damage to the lithium transition metal oxide occurs due to the aqueous solution.

Thus, according to the method of preparing a cathode active material according to the embodiment of the present invention, since the boron-containing compound is dry mixed with the lithium transition metal oxide and a heat treatment is performed near the melting point of the boron-containing compound to melt and flow the boron-containing compound, the advantage of the wet mixing method, i.e., a uniform coating layer, may be realized without causing the damage to the lithium transition metal oxide, i.e., the limitation of the wet mixing method.

Specifically, the boron-containing compound, for example, $H_3BO_3$, begins to be melted while being softened at low temperature, for example, in a temperature range of about 130° C. to about 160° C.

Since the boron-containing compound may react with at least a portion of lithium impurities present in the lithium transition metal oxide while being melted and flowing by the heat treatment, the boron-containing compound may be easily transformed into a lithium boron oxide to be coated on the surface of the lithium transition metal oxide. Thus, the lithium impurities present in the lithium transition metal oxide may be reduced by the transformation of the lithium impurities into the lithium boron oxide.

According to the method of preparing a cathode active material according to the embodiment of the present invention, the heat treatment is performed in a temperature range of 130° C. to 300° C., near the melting point of the boron-containing compound, and may be performed in a temperature range of 130° C. to 200° C., for example, for 3 hours to 10 hours.

In the case that the heat treatment temperature is less than 130° C., since the boron-containing compound is not sufficiently melted, the boron-containing compound may remain as it is or may not form a uniform coating layer even if it is transformed into the lithium boron oxide. In the case in which the heat treatment temperature is greater than 300° C., since the reaction may be excessively fast due to the high temperature, a uniform coating layer may not be formed on the surface of the lithium transition metal oxide.

According to the method of preparing a cathode active material according to the embodiment of the present invention, since the heat treatment is performed at a specific temperature, a coating layer may be formed in which the lithium boron oxide is uniformly coated on the surface of the lithium transition metal oxide in an amount proportional to the used amount of the boron-containing compound.

In the preparation method according to the embodiment of the present invention, the dry mixing may be performed by a mortar grinder mixing method and a mechanical milling method. For example, it may be desirable to use the mechanical milling method to form a uniform coating layer.

Specifically, in the mortar grinder mixing method, lithium transition metal oxide and boron-containing compound are uniformly mixed using a mortar, and a heat treatment may then be performed in the above heat treatment temperature range.

Also, the mechanical milling method, for example, may mix lithium transition metal oxide and boron-containing compound by mechanical attrition using a roll mill, ball mill, high energy ball mill, planetary mill, stirred ball mill, vibrating mill, or jet mill, and for example, compressive stress may be mechanically applied by rotating at a speed of 100 rpm to 1,500 rpm.

In the case that the mechanical milling method is used, the lithium transition metal oxide and boron-containing compound are mixed by the mechanical milling method, and then the mixture may be heat treated in the above temperature range or mixing and heat treatment may be simultaneously performed in the above milling device. According to an embodiment of the present invention, the mechanical milling method, instead of the mortar grinder mixing method, may be used to form a uniform coating layer.

In the method of preparing a cathode active material according to the embodiment of the present invention, an amount of the boron-containing compound used is in a range of 0.05 wt % to 1 wt % and may be in a range of 0.1 wt % to 0.8 wt % based on a total weight of the lithium transition metal oxide.

According to an embodiment of the present invention, an amount of elemental boron (B) included in the coating layer of the cathode active material may be increased as the amount of the boron-containing compound used is increased within the above range.

Also, according to an embodiment of the present invention, a portion of the elemental B of the lithium boron oxide may be doped into the lithium transition metal oxide by the heat treatment, and the amount of the B may have a concentration gradient gradually decreasing from the surface of the lithium transition metal oxide to the inside thereof.

Furthermore, the present invention provides a cathode active material which includes a lithium transition metal oxide; and a coating layer including a lithium boron oxide on a surface of the lithium transition metal oxide.

The coating layer may include elemental B in an amount of 100 ppm to 2,000 ppm, for example, 250 ppm to 1,100 ppm.

Also, in the cathode active material according to the embodiment of the present invention, the lithium boron oxide included in the coating layer may be included in an amount of 0.05 wt % to 1 wt %, for example, 0.1 wt % to 0.8 wt % based on a total weight of the cathode active material.

In the case that the amount of the lithium boron oxide is less than 0.05 wt %, since a thickness of the coating layer formed on the surface of the lithium transition metal oxide may be decreased, an effect of suppressing side reactions between electrolytes during charge and discharge may be insignificant. In the case in which the amount of the lithium boron oxide is greater than 1 wt %, since the thickness of the coating layer may be increased due to the excessive amount of the lithium boron oxide, electrochemical properties of a lithium secondary battery may be reduced due to the resulting increase in resistance.

The lithium boron oxide may be $LiBO_2$, $Li_2B_4O_7$, or a mixture thereof.

Also, the thickness of the coating layer may be in a range of 10 nm to 1,000 nm.

In the cathode active material according to the embodiment of the present invention, a typically used lithium transition metal oxide may be used as the lithium transition metal oxide, and examples of the lithium transition metal oxide may be any one selected from the group consisting of a lithium-cobalt-based oxide, a lithium-manganese-based oxide, a lithium-nickel-manganese-based oxide, a lithium-manganese-cobalt-based oxide, and a lithium-nickel-manganese-cobalt-based oxide, or a mixture of two or more thereof. In particular, a layered-structure lithium transition meal oxide having high capacity characteristics may be used and may be represented by Chemical Formula 1 below:

$$Li_{1+a}[Ni_xMn_yCo_zM_v]O_{2-c}A_c \qquad \text{<Chemical Formula 1>}$$

where M is any one selected from the group consisting of aluminum (Al), zirconium (Zr), zinc (Zn), titanium (Ti), magnesium (Mg), gallium (Ga), and indium (In), or two or more elements thereof; A is at least one selected from the group consisting of phosphorus (P), fluorine (F), sulfur (S), and nitrogen (N), and 0≤x≤1.0, 0≤y<0.6, 0≤z<0.6, 0≤v≤0.1, 0≤a<0.3, 0≤c≤0.2, and a+x+y+z+v=1.

The lithium impurities, which may be present in the surface of the lithium transition metal oxide, may include at least one of LiOH and $Li_2CO_3$.

For example, the lithium impurities having the following Chemical Formula 2 may be included in the lithium transition metal oxide:

$$(1-s-t)[Li(Li_aMn_{(1-a-x-z)}Ni_xCo_z)O_2] \cdot s[Li_2CO_3] \cdot t[LiOH] \qquad \text{<Chemical Formula 2>}$$

where 0≤a<0.3, 0≤x<0.9, 0≤z<0.6, 0<s<0.05, and 0<t<0.05.

The lithium impurities present in the lithium transition metal oxide may be included in an amount of 0.1 wt % to 0.6 wt % based on the total weight of the lithium transition metal oxide.

According to an embodiment of the present invention, since at least a portion of the lithium impurities in the lithium transition metal oxide reacts to be transformed into the lithium boron oxide, the amount of the lithium impurities may be decreased by about 30% to about 70%, for example, about 40% to about 70% in comparison to the amount of the lithium impurities before the lithium impurities are transformed into the lithium boron oxide.

Specifically, the lithium impurities present in the lithium transition metal oxide according to the present invention may be included in an amount of less than 0.3 wt % based on the total weight of the cathode active material. The reason for this is that since the lithium impurities, such as LiOH or $Li_2CO_3$, may have high reactivity with the electrolyte, a swelling phenomenon may excessively occur in the case that the amount of the lithium impurities present in the lithium transition metal oxide is 0.3 wt % or more.

Also, according to an embodiment of the present invention, a trace amount of the elemental B of the lithium boron oxide may be further included by doping into the lithium transition metal oxide.

In the case that the lithium transition metal oxide is doped with a portion of the elemental B of the lithium boron oxide, the lithium transition metal oxide, for example, is represented by Chemical Formula 3 below.

$$Li_{1+a}[Ni_xMn_yCo_zB_wM_v]O_{2-c}A_c \qquad \text{<Chemical Formula 3>}$$

where M is any one selected from the group consisting of Al, Zr, Zn, Ti, Mg, Ga, and In, or two or more elements thereof; A is at least one selected from the group consisting of P, F, S, and N, and $0 \leq x \leq 1.0$, $0 \leq y < 0.6$, $0 \leq z < 0.6$, $0 \leq v \leq 0.1$, $0 \leq a < 0.3$, $0 \leq c \leq 0.2$, $a+x+y+z+v=1$, and $0 \leq w \leq 0.1$.

In this case, w may have a concentration gradient gradually decreasing from the surface of the lithium transition metal oxide to the inside thereof.

The present invention provides a cathode including the cathode active material.

Also, the present invention provides a cathode including the cathode active material.

The cathode may be prepared according to a typical method known in the art. For example, a binder, a conductive agent, and a dispersant, if necessary, as well as a solvent are mixed with a cathode active material and stirred to prepare a slurry, and a metal current collector is then coated with the slurry and pressed. Thereafter, the cathode may be prepared by drying the metal current collector.

Any metal may be used as the metal current collector so long as it is a metal having high conductivity as well as no reactivity in a voltage range of the battery to which the slurry of the cathode active material may be easily adhered. Non-limiting examples of the cathode collector may include aluminum, nickel, or a foil prepared by a combination thereof.

An organic solvent, such as N-methylpyrrolidone (NMP), dimethylformamide (DMF), acetone, and dimethylacetamide, or water may be used as the solvent for forming the cathode. These solvents may be used alone or in a mixture of two or more thereof. An amount of the solvent used may be sufficient if the solvent may dissolve and disperse the cathode active material, the binder, and the conductive agent in consideration of a coating thickness of the slurry and manufacturing yield.

Various types of binder polymers, such as a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, a styrene-butadiene rubber (SBR), a fluorine rubber, poly(acrylic acid), polymers in which hydrogens thereof are substituted with Li, sodium (Na), or Ca, or various copolymers, may be used as the binder.

Any conductive agent may be used without particular limitation so long as it has suitable conductivity without causing adverse chemical changes in the batteries. For example, the conductive agent may include a conductive material such as: graphite such as natural graphite and artificial graphite; carbon black such as carbon black, acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives.

Also, the present invention provides a lithium secondary battery including the cathode, an anode, and a separator disposed between the cathode and the anode.

A carbon material, lithium metal, silicon, or tin, which may intercalate and deintercalate lithium ions, may be typically used as an anode active material that is used in the anode according to an embodiment of the present invention.

Furthermore, the anode collector is generally fabricated to have a thickness of 3 μm to 500 μm. The anode collector is not particularly limited so long as it has conductivity without causing adverse chemical changes in the batteries. The anode collector may be formed of, for example, copper, stainless steel, aluminum, nickel, titanium, baked carbon, copper or stainless steel that is surface-treated with one of carbon, nickel, titanium, silver, or the like, an aluminum-cadmium alloy, or the like. Similar to the cathode, a binder and a conductive agent, which are typically used in the art, may be used in the anode. An anode active material and the above additives are mixed and stirred to prepare an anode active material composition. Then, a current collector is coated therewith and pressed to prepare the anode.

The separator is disposed between the cathode and the anode, and a thin insulating film having high ion permeability and mechanical strength may be used as the separator. Since the separator is known in the art, the detailed descriptions thereof are omitted in the present specification.

A shape of the lithium secondary battery of the present invention is not particularly limited, and for example, a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Preferred examples of the medium and large sized device may be an electric vehicle, a hybrid electric vehicle, a plug-in hybrid electric vehicle, or a power storage system, but the medium and large sized device is not limited thereto.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Hereinafter, the present invention will be described in more detail, according to examples and experimental examples. However, the present invention is not limited thereto.

<Preparation of Cathode Active Material>

Example 1

MOOH ($M=N_{0.78}Mn_{0.11}Co_{0.11}$) was used as a mixed transition metal precursor, the mixed transition metal precursor and $Li_2CO_3$ were mixed at a stoichiometric ratio (Li:M=1.00:1), and $LiNi_{0.78}Mn_{0.11}Co_{0.11}O_2$ was prepared by sintering the mixture in a temperature range of about 800° C. to about 900° C. for 10 hours in air.

$LiNi_{0.78}Mn_{0.11}Co_{0.11}O_2$ and $H_3BO_3$ were weighed at a weight ratio of 100:0.17 and mixed with a dry mixer (CYCLOMIX, HOSOKAWA Micron Corporation) to obtain mixed powder. The powder thus obtained was heat treated at 150° C. for 5 hours in an oxygen atmosphere. A cathode active material including $LiBO_2$ and $Li_2B_4O_7$ in the surface of $LiNi_{0.78}Mn_{0.11}Co_{0.11}O_2$ was obtained by the above method. A thickness of the coating layer was 150 nm.

Example 2

A cathode active material was prepared in the same manner as in Example 1 except that $LiNi_{0.78}Mn_{0.11}Co_{0.11}O_2$ and $H_3BO_3$ were used at a weight ratio of 100:0.34.

In the cathode active material, a thickness of the coating layer was 230 nm.

Example 3

A cathode active material was prepared in the same manner as in Example 1 except that $LiNi_{0.78}Mn_{0.11}Co_{0.11}O_2$ and $H_3BO_3$ were used at a weight ratio of 100:0.68.

In the cathode active material, a thickness of the coating layer was 300 nm.

Comparative Example 1

A cathode active material was prepared in the same manner as in Example 1 except that $LiNi_{0.78}Mn_{0.11}Co_{0.11}O_2$ and $H_3BO_3$ were used at a weight ratio of 100:0.09 and a heat treatment was not performed.

In the cathode active material, a thickness of the coating layer was 100 nm.

Comparative Example 2

A cathode active material was prepared in the same manner as in Comparative Example 1 except that $LiNi_{0.78}Mn_{0.11}Co_{0.11}O_2$ and $H_3BO_3$ were used at a weight ratio of 100:0.17.

In the cathode active material, a thickness of the coating layer was 150 nm.

Comparative Example 3

A cathode active material was prepared in the same manner as in Comparative Example 1 except that $LiNi_{0.78}Mn_{0.11}Co_{0.11}O_2$ and $H_3BO_3$ were used at a weight ratio of 100:0.34.

In the cathode active material, a thickness of the coating layer was 160 nm.

<Preparation of Lithium Secondary Battery>

Example 4

Cathode Preparation

The cathode active material prepared in Example 1, which included a coating layer containing $LiBO_2$ and $Li_2B_4O_7$ in the surface of $LiNi_{0.78}Mn_{0.11}Co_{0.11}O_2$, was used.

A cathode mixture slurry was prepared by adding 94 wt % of the cathode active material, 3 wt % of carbon black as a conductive agent, and 3 wt % of PVdF as a binder to N-methyl-2-pyrrolidone (NMP) as a solvent. An about 20 μm thick aluminum (Al) thin film as a cathode collector was coated with the cathode mixture slurry and dried, and the Al thin film was then roll-pressed to prepare a cathode.

Anode Preparation

An anode active material slurry was prepared by mixing 96.3 wt % of carbon powder as an anode active material, 1.0 wt % of super-p as a conductive agent, and 1.5 wt % of styrene-butadiene rubber (SBR) and 1.2 wt % of carboxymethyl cellulose (CMC) as a binder, and adding the mixture to NMP as a solvent. A 10 μm thick copper (Cu) thin film as an anode collector was coated with the anode active material slurry and dried, and the Cu thin film was then roll-pressed to prepare an anode.

Non-Aqueous Electrolyte Solution Preparation

A 1 M $LiPF_6$ non-aqueous electrolyte solution was prepared by adding $LiPF_6$ to a non-aqueous electrolyte solvent that was prepared by mixing ethylene carbonate and diethyl carbonate, as an electrolyte, at a volume ratio of 30:70.

Lithium Secondary Battery Preparation

A mixed separator of polyethylene and polypropylene was disposed between the cathode and anode thus prepared, and a polymer type battery was then prepared by a typical method. Then, the preparation of each lithium secondary battery was completed by injecting the prepared non-aqueous electrolyte solution.

Examples 5 and 6

Lithium secondary batteries were prepared in the same manner as in Example 4 except that the cathode active materials prepared in Examples 2 and 3 were respectively used.

Comparative Examples 4 to 6

Lithium secondary batteries were prepared in the same manner as in Example 4 except that the cathode active materials prepared in Comparative Examples 1 to 3 were respectively used.

Experimental Example 1: Inductively Coupled Plasma (ICP) Mass Analysis

In order to investigate the amounts of elemental B included in the coating layers of the cathode active materials prepared in Examples 1 to 3 and Comparative Examples 1 to 3, the coating layers were analyzed by inductively coupled plasma-atomic emission spectroscopy (ICP-AES).

Specifically, 0.1 g of each of the cathode active materials prepared in Examples 1 to 3 and Comparative Examples 1 to 3 was sampled, 2 ml of distilled water and 3 ml of concentrated nitric acid were added thereto, and each sample was dissolved after closing a lid. After the sample was completely dissolved, the solution was diluted by adding 50 ml of ultrapure water thereto. Thereafter, the diluted solution was again diluted in 10 times and then analyzed with an inductively coupled plasma-atomic emission spectrometer (ICP-AES). The ICP-AES (ICP 5300DV, PerkinElmer Inc.) was operated under the following conditions: Forward Power 1,300 W; Torch Height 15 mm, Plasma Gas Flow Rate 15.00 L/min; Sample Gas Flow Rate 0.8 L/min; Auxiliary Gas Flow Rate 0.20 L/min; and Pumping Speed 1.5 ml/min. As a result, the amounts of elemental B included in the coating layers of the cathode active materials prepared in Examples 1 to 3 and Comparative Examples 1 to 3 are presented in Table 1 below.

TABLE 1

| Examples | Amount of $H_3BO_3$ used (wt %) | B content (ICP) | |
|---|---|---|---|
| | | B (experimental value, ppm) | B (theoretical value, ppm) |
| Example 1 | 0.17 | 275 | 290 |
| Example 2 | 0.34 | 575 | 585 |
| Example 3 | 0.68 | 1,110 | 1,170 |
| Comparative Example 1 | 0.09 | 145 | 145 |
| Comparative Example 2 | 0.17 | 290 | 290 |
| Comparative Example 3 | 0.34 | 290 | 585 |

As illustrated in Table 1, there was a difference between the amounts of the elemental B included in the examples subjected to the heat treatment at 150° C. and the comparative examples not subjected to a heat treatment even if the same amount of $H_3BO_3$ was used.

Specifically, with respect to Examples 1 to 3 subjected to the heat treatment at 150° C., i.e., near the melting point of $H_3BO_3$, the amount of the elemental B included in the cathode active material was also increased from 275 ppm to 1,110 ppm similar to the theoretical value as the amount of the $H_3BO_3$ used was increased from 0.17 wt % to 0.68 wt %.

However, with respect to Comparative Examples 1 to 3 not subjected to a heat treatment, as a result of changing the amount of the $H_3BO_3$ used to 0.09 wt %, 0.17 wt %, and 0.34 wt %, the amount of the elemental B included in the cathode active material was increased similar to the theoretical value in the case that the amount of the $H_3BO_3$ used was 0.09 wt % and 0.17 wt %. However, in the case in which the amount of the $H_3BO_3$ used was 0.34%, the amount of the elemental B was the same as that of the case of using 0.17 wt %.

In the case that the heat treatment was not performed as in the comparative examples, it may be understood that the amount of the elemental B included in the cathode active material was not increased when adding $H_3BO_3$ in a predetermined amount or more.

In contrast, in the case that the heat treatment was performed as in Examples 1 to 3, it may be understood that the amount of the elemental B was detected from the cathode active material by the amount of the $H_3BO_3$ used.

Figure 2:
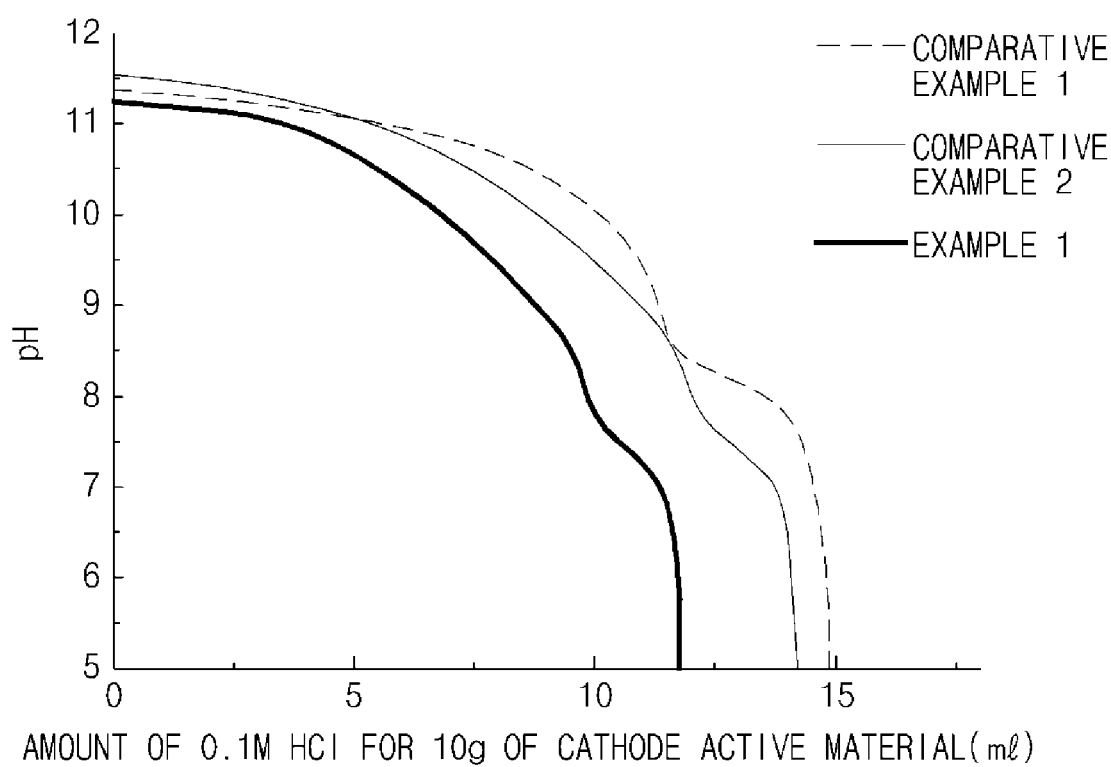
FIG. 2 is a graph illustrating the results of pH titration to investigate the amounts of lithium impurities of cathode active materials prepared in Example 1 of the present invention and Comparative Examples 1 and 2.

Experimental Example 2: pH Titration Experiment to Investigate the Amount of Lithium Impurities In order to investigate the amounts of lithium impurities in the cathode active materials prepared in Example 1 and Comparative Examples 1 and 2, pH titrations were performed, and the results thereof are presented in FIG. 2. Metrohm 794 was used as a pH meter and pH values were recorded while titrating in 0.02 ml increments.

FIG. 2 is a graph comparing the amounts of lithium impurities reduced in respective cathode active materials of Example 1 and Comparative Examples 1 and 2.

That is, as a result of comparing the amounts of 0.1 M HCl for 10 g of the respective cathode active materials, when comparing the amounts of hydrochloric acid used for hydrochloric acid titration with reference to FIG. 2, Example 1 was about 11.6 ml, Comparative Example 1 was 15 ml, and Comparative Example 2 was about 14.2 ml. Thus, it may be understood that Example 1 was decreased by about 20% or more in comparison to Comparative Examples 1 and 2.

Experimental Example 3: Output Characteristics after High-Temperature Storage and Resistance Increase Rate Evaluation Tests FIG. 3 is a graph illustrating the results of measuring capacity characteristics after high-temperature storage (60° C.) of the lithium secondary batteries of Example 5 and Comparative Example 4 according to Experimental Example 3.

The lithium secondary batteries of Example 5 (cathode active material of Example 2) and Comparative Example 4 (cathode active material of Comparative Example 1) were stored at 60° C. and then charged at 1 C to 4.15 V/30 mA under a constant current/constant voltage (CC/CV) condition. Then, the lithium secondary batteries were discharged at a constant current (CC) of 1 C to a voltage of 2.5 V to measure discharge capacities. The results thereof are presented in FIG. 3.

Figure 3:
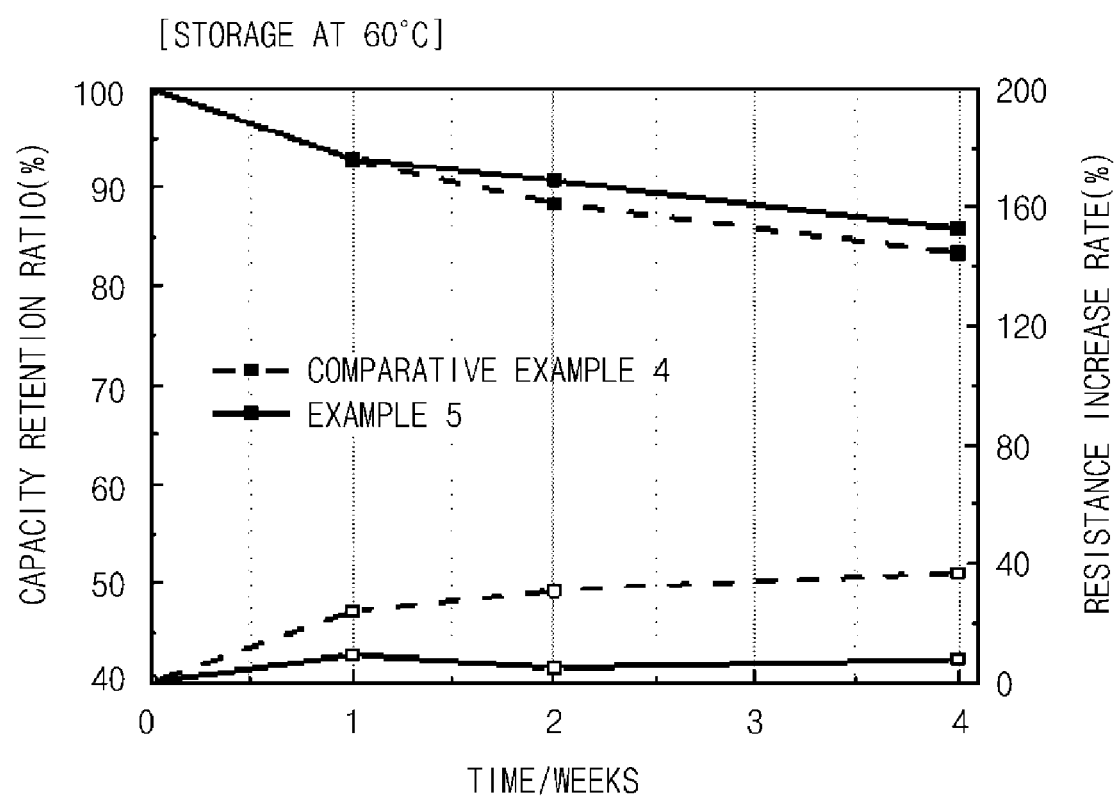
FIG. 3 is a graph illustrating the results of measuring capacity characteristics after high-temperature storage (60° C.) of lithium secondary batteries of Example 5 and Comparative Example 4 according to Experimental Example 3.

Referring to FIG. 3, a slope of a capacity retention ratio of the lithium secondary battery of Example 5 of the present invention was slower than that of the lithium secondary battery of Comparative Example 4 to a storage time of 4 weeks. Specifically, it may be understood that the capacity retention ratio of the lithium secondary battery of Example 5 was increased by about 3% at a storage time of 4 weeks in comparison to that of the lithium secondary battery of Comparative Example 4.

Also, it may be understood that a resistance increase rate of the lithium secondary battery of Example 5 was decreased by about 25% in comparison to that of the lithium secondary battery of Comparative Example 4. It may be understood that the decrease in the resistance increase rate to about 25% may also affect output characteristics. That is, it may be understood that the lithium secondary battery of Example 5 may exhibit excellent output characteristics due to the decrease in the resistance increase rate.

Experimental Example 4: High-Temperature (45° C.) Cycle Characteristics and Resistance Increase Rate Evaluation Tests The lithium secondary batteries of Example 5 and Comparative Example 4 were charged at 1 C to 4.15 V/30 mA at 45° C. under a constant current/constant voltage (CC/CV) condition and then discharged at a constant current (CC) of 2 C to a voltage of 2.5 V to measure discharge capacities. The charge and discharge were repeated 1 to 400 cycles and the measured discharge capacities are presented in FIG. 4.

Figure 4:
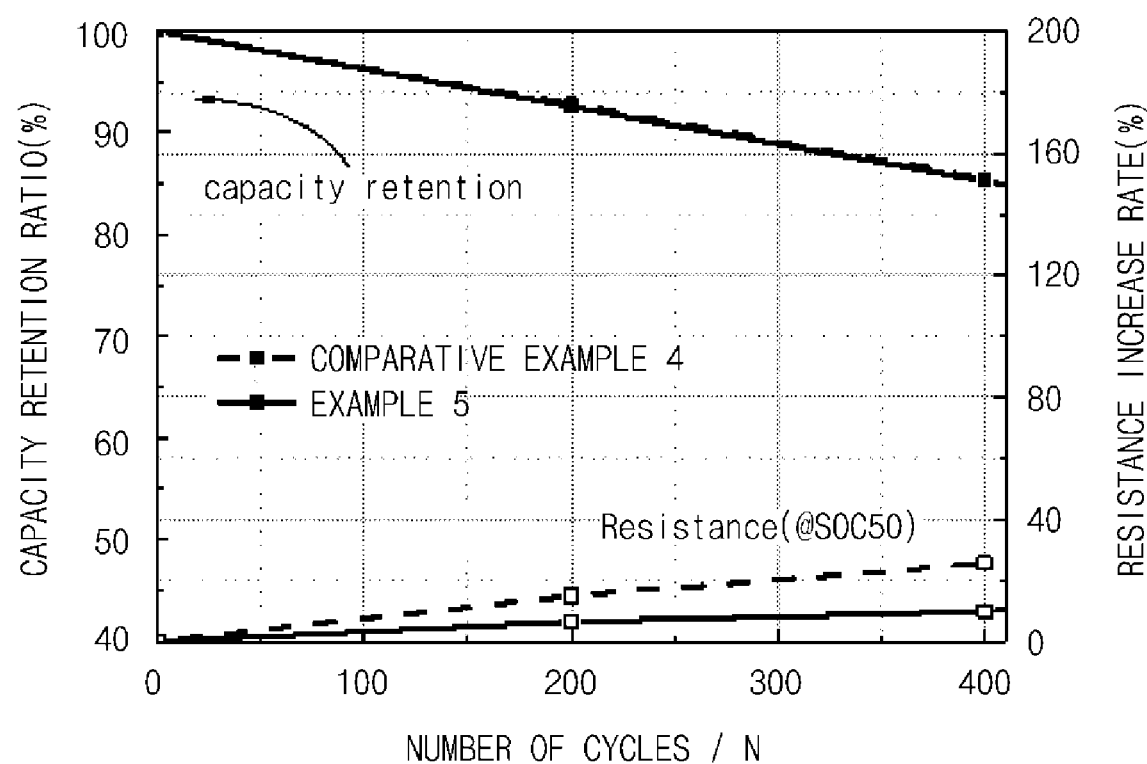
FIG. 4 is a graph illustrating the results of measuring high-temperature (45° C.) cycle characteristics of lithium secondary batteries of Example 5 and Comparative Example 4 according to Experimental Example 4.

Referring to FIG. 4, the lithium secondary battery of Example 5 of the present invention exhibited the slope of the capacity retention ratio similar to that of Comparative Example 4 to the $400^{th}$ cycle.

However, it may be understood that the resistance increase rate of the lithium secondary battery of Example 5 was decreased by about 7% at the $400^{th}$ cycle in comparison to that of the lithium secondary battery of Comparative Example 4. It may be understood that the decrease in the resistance increase rate may also affect output characteristics. That is, it may be understood that the lithium secondary battery of Example 5 may exhibit excellent output characteristics due to the decrease in the resistance increase rate.

The invention claimed is:

1. A cathode active material comprising:
   a core-shell structure having a core and a coating layer disposed on the surface of the core,
   wherein the core consists of a lithium transition metal oxide and optionally lithium impurities which result from the synthesis of the lithium transition metal oxide; and
   wherein the coating layer having an inner surface and an outer surface separated by a thickness, the inner surface facing the core,
   wherein the coating layer consists of a lithium boron oxide and the lithium impurities, the lithium impurities present in the coating layer only at the inner surface,
   wherein the lithium boron oxide is $LiBO_2$, $Li_2B_4O_7$, or a mixture thereof,
   wherein the lithium impurities include at least one of $Li_2CO_3$ and LiOH,
   wherein the lithium impurities are present in an amount of less than 0.3 wt % based on a total weight of the cathode active material, and
   wherein the lithium transition metal oxide is represented by Chemical Formula 3, and, in Chemical Formula 3, w has a concentration gradient gradually decreasing from the surface of the lithium transition metal oxide to inside thereof:

 <Chemical Formula 3> where M is any one selected from the group consisting of aluminum (Al), zirconium (Zr), zinc (Zn), titanium (Ti), magnesium (Mg), gallium (Ga), and indium (In), or two or more elements thereof; A is at least one selected from the group consisting of phosphorus (P), fluorine (F), sulfur (S), and nitrogen (N), and $0 \leq x \leq 1.0$, $0 \leq y \leq 0.6$, $0 \leq z \leq 0.6$, $0 \leq v \leq 0.1$, $0 \leq a < 0.3$, $0 \leq c \leq 0.2$, $a+x+y+z+v=1$, and $0 < w \leq 0.1$.

2. The cathode active material of claim 1, wherein elemental boron (B) in an amount of 100 parts per million (ppm) to 2,000 ppm, based on a total mass of the cathode active material.

3. The cathode active material of claim 1, wherein the coating layer comprises elemental B in an amount of 250 parts per million (ppm) to 1,100 ppm, based on a total mass of the cathode active material.

4. The cathode active material of claim 1, wherein a thickness of the coating layer is in a range of 10 nm to 1,000 nm.

5. A cathode comprising the cathode active material of claim 1.

6. A lithium secondary battery comprising the cathode of claim 5.

7. The cathode active material of claim 1, wherein the lithium impurities are present in an amount ranging from 0.1 wt % to less than 0.3 wt % based on the total weight of the cathode active material.

\* \* \* \* \*